US010310354B2

(12) United States Patent
Zhou et al.

(10) Patent No.: US 10,310,354 B2
(45) Date of Patent: Jun. 4, 2019

(54) ELECTROFLUIDIC SUPPORT PLATES AND PREPARATION METHOD THEREFOR, AND ELECTROFLUIDIC APPARATUS

(71) Applicants: ACADEMY OF SHENZHEN GUOHUA OPTOELECTRONICS, Guangdong Province (CN); SOUTH CHINA NORMAL UNIVERSITY, Guangdong Province (CN); SHENZHEN GUOHUA OPTOELECTRONICS CO., LTD., Guangdong Province (CN)

(72) Inventors: Guofu Zhou, Guangdong Province (CN); Hao Wu, Guangdong Province (CN); Fahong Li, Guangdong Province (CN); Robert Andrew Hayes, Guangdong Province (CN)

(73) Assignees: South China Normal University, Guangzhou (CN); Academy of Shenzhen Guohua Optoelectronics, Shenzhen (CN); Shenzhen Guohua Optoelectronics Co., Ltd., Shenzhen (CN)

( * ) Notice: Subject to any disclaimer, the term of this patent is extended or adjusted under 35 U.S.C. 154(b) by 0 days.

(21) Appl. No.: 15/752,867

(22) PCT Filed: Jan. 7, 2016

(86) PCT No.: PCT/CN2016/070365
§ 371 (c)(1),
(2) Date: Feb. 14, 2018

(87) PCT Pub. No.: WO2017/028484
PCT Pub. Date: Feb. 23, 2017

(65) Prior Publication Data
US 2018/0231863 A1    Aug. 16, 2018

(30) Foreign Application Priority Data

Aug. 14, 2015    (CN) .......................... 2015 1 0501123

(51) Int. Cl.
G09F 9/37    (2006.01)
G09G 3/34    (2006.01)
(Continued)

(52) U.S. Cl.
CPC .......... G02F 1/167 (2013.01); G02B 26/005 (2013.01); G09F 9/372 (2013.01); G09G 3/348 (2013.01);
(Continued)

(58) Field of Classification Search
CPC . G09F 9/302; G09F 9/37; G09F 9/372; G02F 1/167; G02F 1/361; G02B 26/004;
(Continued)

(56) References Cited

U.S. PATENT DOCUMENTS 8,885,243 B2 * 11/2014 Kwon .................. G02B 26/005
359/290
8,922,871 B2 * 12/2014 Choi .................... G02B 26/005
359/296
(Continued)

*Primary Examiner* — Loha Ben
(74) *Attorney, Agent, or Firm* — David J. Kulik

(57) ABSTRACT

Disclosed is an electrofluidic support plate and a method for preparing the same, and an electrofluidic device comprising the support plate. The method comprises the following steps of: providing a substrate which has a surface provided with an electrode layer; arranging a first amorphous fluoropolymer layer on the surface of the substrate, and carrying out hydrophilic modification on a surface of the amorphous fluoropolymer layer; arranging pixel walls on the amorphous fluoropolymer layer after hydrophilic modification; arranging a second amorphous fluoropolymer layer which is a hydrophobic layer; the second amorphous fluoropolymer layer covering all surfaces of the pixel walls and a groove (Continued)

area encircled by the pixel walls; filling the groove area encircled by the pixel walls with a protective material; removing the second amorphous fluoropolymer layer not covered by the protective material and on a top of the pixel walls; and removing the protective material.

10 Claims, 3 Drawing Sheets

(51) Int. Cl.
    *G02B 26/00*     (2006.01)
    *G02F 1/167*     (2019.01)

(52) U.S. Cl.
    CPC ..... *B01L 2400/0427* (2013.01); *G02B 26/004* (2013.01)

(58) Field of Classification Search
    CPC .... G02B 26/005; G02B 26/007; G02B 26/02; B01L 2400/04; B01L 2400/0427; G09G 3/34; G09G 3/348; G09G 2300/04; G09G 2300/0421; G09G 2300/0426
    USPC ............ 359/290, 228, 245, 253; 345/60, 84; 445/24
    See application file for complete search history.

(56) References Cited

U.S. PATENT DOCUMENTS

9,417,446 B2 *   8/2016   Schram ................ G02B 26/005
9,495,919 B2 *   11/2016   Schram ................ G09G 3/348

\* cited by examiner

ELECTROFLUIDIC SUPPORT PLATES AND PREPARATION METHOD THEREFOR, AND ELECTROFLUIDIC APPARATUS

CROSS REFERENCE TO RELATED APPLICATIONS

This application is a 371 National Stage of International Application No. PCT/CN2016/070365, filed Jan. 7, 2016, now Publication No. WO 2017/028484, published Feb. 23, 2017, which claims priority benefit of Chinese Application No. 201510501123.8, filed Aug. 14, 2015, each of which is hereby incorporated by reference into this application.

FIELD OF THE INVENTION

The present disclosure relates to an electrowetting technology, and particularly to an electrofluidic support plate and a method for preparing the same, and an electrofluidic device comprising the support plate.

BACKGROUND OF THE INVENTION

Electrofluid is also known as electrowetting. At current, the electrofluidic display (EFD) technology has been widely used, and it provides an electrofluid-based display unit.

For example, an electrofluidic device described in International Patent Application WO 2003/071346 comprises two support plates. A walls pattern (i.e., pixel wall) is arranged on one of the support plates, and the walls pattern defines an image element of the display device. An area between the walls of the image element (also known as pixel) is known as a display area, and a display effect is generated on the display area. The walls of the image element is made of a hydrophilic material. A wide range of the area of the support plate in the display area has to be hydrophobic for proper handling of the image element. During manufacturing, the area where the image element is located in the support plate is covered by a hydrophobic layer. The walls are manufactured by depositing a layer of walls material on the hydrophobic layer and patterning the layer of walls material using (for example) a photoetching method.

Since the walls material layer is hydrophilic, an adhesive force between the walls material layer and the hydrophobic layer is relatively weak, resulting in easy release of the walls material layer from the hydrophobic layer. It is known to reduce the hydrophobicity of the hydrophobic layer before applying the walls material layer, for example, by reactive ion etching. After forming the walls, the hydrophobic layer is heated to restore its hydrophobicity. However, during the plasma etching or heat treatment, the hydrophobic layer will inevitably be damaged and the hydrophobic and insulating properties will be affected. This will cause the ink (oil) incompletely return problem when the voltage is turned off. Therefore, the quality of the display device manufactured by the method is unsatisfactory.

For this reason, some improvements have also been made. For example, a solution, proposed in the application with Application No. CN201410159289.1, is that a hydrophobic layer material is arranged on a support plate with a hydrophilic layer material, and a hydrophobic surface can be protected from damage by means of a method of adding a protective layer in a groove in the hydrophobic surface and then etching, solving the quality problem caused by the damage of the surface of the hydrophobic layer. However, there is a problem with this method. After the hydrophobic material being etched into a grid-like pattern, a short-circuit problem will be caused by the water on the hydrophobic insulated layer (or ionic liquid or a salt solution such as an aqueous solution of sodium chloride) contacting a lower electrode after switching on and off many times due to a gap between the hydrophobic layer and the walls material while bonding, thereby affecting the reliability of the device.

SUMMARY OF THE INVENTION

In order to solve the above technical problem, the present disclosure provides an electrofluidic support plate and a method for preparing the same, which can solve reliability problem caused by ink incompletely returning and improve the device quality by avoiding the gap between the insualting layer and the walls.

The present disclosure adopts a technical solution as follows:

a method for preparing an electrofluidic support plate, comprising the following steps of:

1) providing a substrate which has a surface provided with an electrode layer;

2) arranging a first amorphous fluoropolymer layer on the surface of the substrate, and carrying out hydrophilic modification on a surface of the amorphous fluoropolymer layer;

3) arranging pixel walls on the amorphous fluoropolymer layer after hydrophilic modification;

4) arranging a second amorphous fluoropolymer layer which is a hydrophobic layer; the second amorphous fluoropolymer layer covering all surfaces of the pixel walls and groove areas encircled by the pixel walls;

5) filling the groove areas encircled by the pixel walls with a protective material;

6) removing the second amorphous fluoropolymer layer not covered by the protective material and on top of the pixel walls; and 7) removing the protective material.

Preferably, the first amorphous fluoropolymer layer and the second amorphous fluoropolymer layer obtained in the step 2) and the step 4) may be, but not limited to, formed by Dupont Teflon AF series, Solvay Hyflon series or Asahi Glass Cytop series.

Preferably, the total thickness of the first amorphous fluoropolymer layer and the second amorphous fluoropolymer layer obtained in the step 2) and the step 4) is 100 nm-2000 nm; and further preferably, 300 nm-1200 nm.

Preferably, the thickness of the pixel walls obtained in the step 3) is greater than or equal to 2 μm.

The protective material in the step 5) may be photoresist, preferably positive photoresist.

Preferably, in the step 5) the protective material is filled by any one of: dip-coating, slit-coating, silk-screen printing, spray-coating, spin-coating or blade-coating.

Preferably, the thickness of the pixel walls obtained in the step 6) is 2-20 μm.

According to another aspect of the present disclosure, further providing an electrofluidic support plate prepared by the above method, and an electrofluidic device comprising the electrofluidic support plate.

The present disclosure has the beneficial effects that: according to the preparation method of the present disclosure, the surface of the second amorphous fluoropolymer layer as the hydrophobic layer is not subject to the physical or chemical damages, so that problems that the ink does not return completely and reliability is poor due to damages of the surface of the hydrophobic layer can be solved.

Moreover, the first amorphous fluoropolymer layer pre-arranged below the pixel walls is integrated with the second amorphous fluoropolymer layer post-arranged on the surface as a whole, which completely avoids the short circuit or breakthrough or other reliability problems caused by the gap formed between the hydrophobic layer and the walls material. Therefore, the existing of gap between the hydrophobic material and the pixel walls is avoided, and the problem of short-circuit of an upper support plate and a lower support plate due to the gap between the hydrophobic layer and the pixel walls is solved, thereby improving the switching on-off performance of the device and improving the quality and reliability of the product. The present disclosure can be applied to the electrofluidic devices, particularly to the electrofluidic display devices.

BRIEF DESCRIPTION OF THE DRAWINGS

The embodiments of the present disclosure are further described hereinafter with reference to the drawings.

DETAILED DESCRIPTION OF THE EMBODIMENTS

It should be noted that the embodiments in the application and the features in the embodiment can be mutually combined in case of no conflicts.

Figure 1:
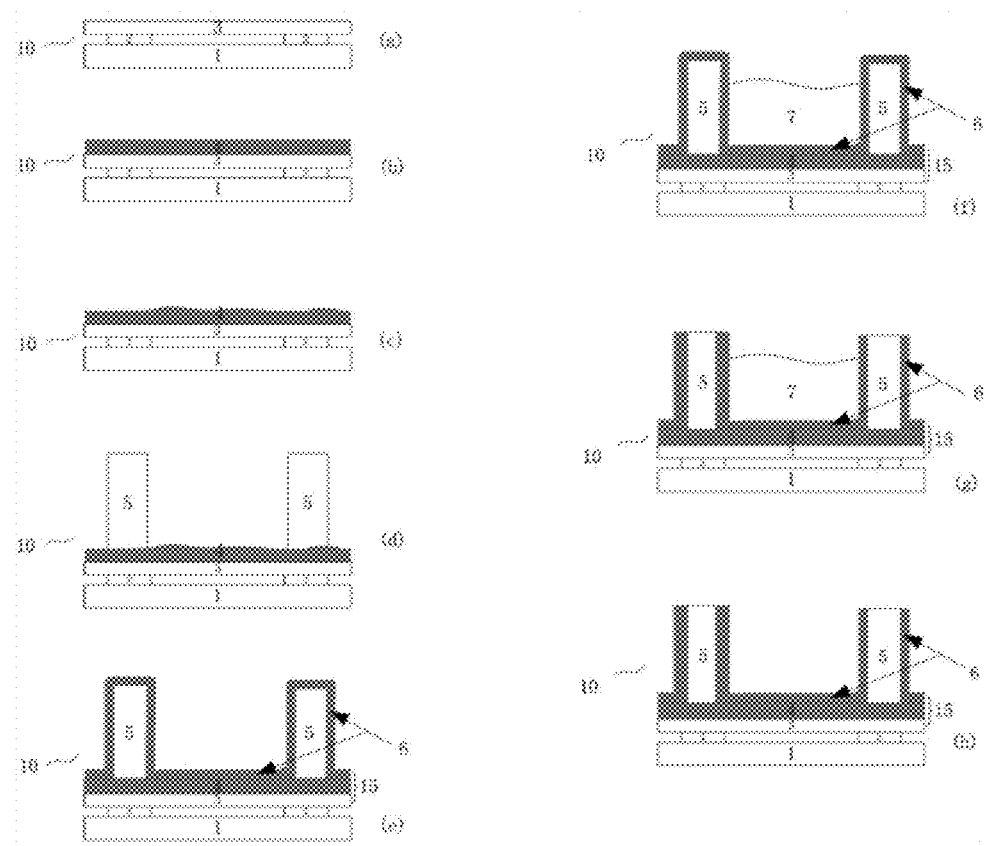
FIG. 1 is a schematic diagram of a preparation process of an electrofluidic support plate of the present disclosure.

As shown in FIG. 1, according to an exemplary embodiment of the present disclosure, an electrofluidic support plate 10 of the present disclosure is prepared by the following steps.

1) As shown in FIG. 1 (a), providing a substrate 1, which has a surface provided with an electrode layer 2.

The substrate 1 may be a glass or polymer substrate, and also may be rigid or flexible. Generally, the electrode layer 2 is arranged on the substrate 1. In order to avoid short circuit between an upper substrate and a lower substrate, a dielectric layer 3 may be arranged on the electrode layer 2, and the dielectric layer 3 may be a layer of silicon oxide or a silicon nitride, and has a thickness of 200 nm for instance. Of course, the dielectric layer may also not be arranged, and the specific reasons shall be described in the following steps.

2) Arranging a first amorphous fluoropolymer layer 4 on the surface of the substrate, and hydrophilic modification on the surface of the amorphous fluoropolymer layer 4 is carried out, as shown in FIG. 1(b) and FIG. 1(c).

The amorphous fluoropolymer material is preferably, but not limited to be formed by Dupont Teflon AF series, Solvay Hyflon series or Asahi Glass Cytop series, and may additionally be any other amorphous fluoropolymer. Preferably, the first amorphous fluoropolymer layer 4 has a thickness between 100 nm and 2000 nm, more preferably between 100 nm and 1200 nm. It can be coated by, but not limited to, spin-coating, blade-coating, screen printing and other methods. After coating, a hot plate or an oven or other methods may be used for heating in order to completely evaporate the solvent. There may be one amorphous fluoropolymer layer or multiple overlapped amorphous fluoropolymer layers.

Since the fluoropolymer material also has the insulating property while being hydrophobic, it can be directly arranged on the electrode layer 2, that is, the first amorphous fluoropolymer layer 4 can serve as the dielectric layer without the need of the additional dielectric layer 3. Alternatively, in order to achieve a better dielectric effect, the first amorphous fluoropolymer layer 4 can be arranged on the dielectric layer 3 after the dielectric layer 3 formed by silicon oxide or silicon nitride is disposed on the electrode layer 2.

After the first amorphous fluoropolymer layer 4 being arranged, the surface thereof is hydrophobic. In order to facilitate the structure of the pixel walls 5 arranged thereon, the surface of the first amorphous fluoropolymer layer 4 needs to be hydrophilically modified. As shown in FIG. 1(c), the surface modification method may be a method such as reactive ion etching (RIE), or other physical or chemical methods.

3) Arranging pixel walls on the first amorphous fluoropolymer layer after hydrophilic modification, as shown in FIG. 1(d).

The pixel walls 5 may be arranged by a known method on the first amorphous fluoropolymer layer 4 with the hydrophilically modified surface. The known method may include coating the pixel material on the surface by spin-coating, blade-coating, slit-coating, screen printing, spray-coating or the like. The material of the pixel walls 5 may be photoresist (e.g., SU-8); then the pixel walls 5 are obtained by prebaking the layer of material of pixel walls 5, then patterning the layer using photolithography, and removing the walls material from the display area.

The width of the pixel walls 5 can be selected as required, and the height of the pixel walls 5 is 2-20 μm.

After the arrangement of the pixel walls 5 being completed, optionally, appropriate heat treatment can be performed to stabilize the walls structure and to avoid affecting the walls structure by the subsequent steps. Preferably, the heat treatment temperature is below 180° C. Preferably, the heat treatment temperature is about 160° C. The heat treatment method may be, but not limited to, heating by the hot plate and the oven.

4) Arranging a second amorphous fluoropolymer layer 6, i.e., a hydrophobic layer; the second amorphous fluoropolymer layer 6 covers all surfaces of the pixel walls 5 and a groove area encircled by the pixel walls, as shown in FIG. 1(e).

The second amorphous fluoropolymer layer 6 may be any other low surface energy polymer, preferably, Teflon AF series (such as AF1600 or AF1601) amorphous fluoropolymer from DuPont Company, Hyflon series amorphous fluoropolymer from Solvay Company or Cytop series amorphous fluoropolymer from Asahi Glass Company. It is mainly used as a hydrophobic layer, playing a hydrophobic role.

The method of specific arrangement may refer to the first amorphous fluoropolymer layer 4.

The first amorphous fluoropolymer layer 4 and the second amorphous fluoropolymer layer 6 may be made of the same fluoropolymer material, or may be made of different materials. Preferably, the total thickness of the first amorphous fluoropolymer layer 4 and the second amorphous fluoropolymer layer 6 is 100-2000 nm, further preferably, 300 nm-1200 nm.

Now an insulation layer 15 consisting of the dielectric layer 3, the first amorphous fluoropolymer layer 4 and the second amorphous fluoropolymer layer 6 is also obtained on the substrate 1. Or, the insulation layer 15 only consists of the first amorphous fluoropolymer layer 4 and the second amorphous fluoropolymer layer 6. The insulation layer 15 is insulated from the electrode layer 2 below, and the upper surface of the insulation layer 15 is hydrophobic.

5) Filling the groove area encircled by the pixel walls with a protective material, as shown in FIG. 1(*f*).

The protective material 7 is mainly used for protecting the second amorphous fluoropolymer layer 6 covered therebelow, and is not reacted with the second amorphous fluoropolymer layer 6. The protective material 7 may be photoresist, or may also be other materials capable of being washed off. The thickness needs to be controlled to at least cover the surface of the hydrophobic layer at the bottom of the groove among all walls.

The protective material 7 may be one layer, two layers or multiple layers, for example, the photoresist may be selected as a first layer of material, and then another layer of material is arranged on the photoresist.

The protective material 7 is preferably, but not limited to, filled by a method such as dip-coating, spin-coating, blade-coating, coating, shower coating, screen printing or spray-coating. As the hydrophobic layer has a lower surface energy, the protective material 7 may be detained in the groove with the material of the hydrophobic layer on the surface among the walls.

6) Removing the second amorphous fluoropolymer layer 6 on the top of the pixel walls which is not covered by the protective material, as shown in FIG. 1(*g*).

The point is to remove the second amorphous fluoropolymer layer 6 on the top of the pixel walls 5 by a method of etching, including, but not limited to, reactive ion etching (RIE), inductive coupling plasma (ICP) etching. In order to etching the second amorphous fluoropolymer layer 6 completely, the degree of etching may be increased to etch part of the walls material below the second amorphous fluoropolymer layer 6.

After removing, the height of the pixel walls 5 may be controlled to be 2-20 μm, and more preferably, 3-8 μm. It is allowed to remove part of the protective material, but not allowed to expose the second amorphous fluoropolymer layer 6 covered by the protective material 7 to be etched.

7) Removing the protective material 7, as shown in FIG. 1(*h*).

The method for removing can be selected in combination with the type of the protective material 7, and does not damage the second amorphous fluoropolymer layer 6 covered by the protective material.

If the protective material 7 is photoresist, optionally, but not limited to, using a developing solution or a degumming solution as a cleaning solution to clean the protective material 7. Or other solutions capable of effectively removing the protective material 7 but not damaging the protected second amorphous fluoropolymer layer 6 may also be selected.

Finally, after cleaning the protective material 7, UV ozone may be selected to clean the surface in order to avoid the residue of the organic matter. This step may also be omitted.

Further, it may also include (or not include) a step of heat-treating the support plate 10, so as to dry the cleaned hydrophobic layer and the surface. The heat treatment step for the amorphous fluoropolymer according to the present disclosure may be performed at a temperature of below 220° C., or preferably at a temperature of below 160° C. Such lower temperature does not affect the hydrophilicity of the hydrophilic material.

The structure of the electrofluidic support plate 10 obtained in the present disclosure is shown in FIG. 1(*h*).

Figure 2:
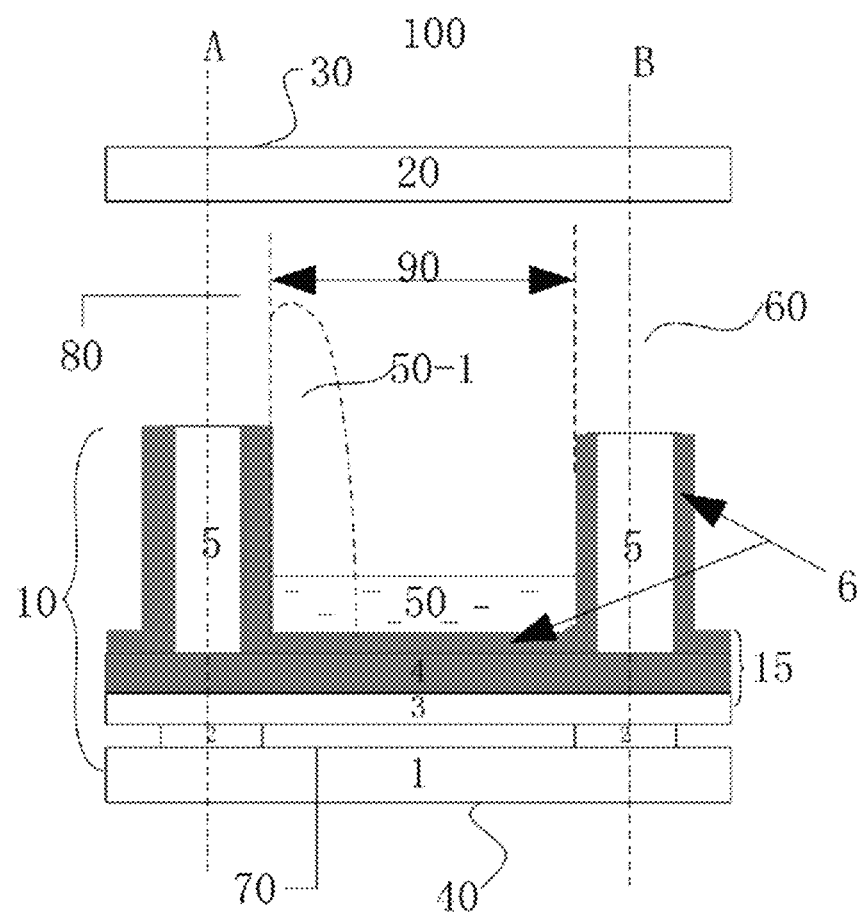
FIG. 2 is a sectional view of an image element structure of an electrofluidic display device of the embodiment of the present disclosure.

A partial cross-section of the electrofluidic display device comprising the electrofluidic support plate in the present disclosure is shown in FIG. 2.

The device comprises a plurality of image elements 100, one of which is shown in the figure. The lateral extent of the image element 100 is represented by two dotted lines A and B in the figure. The image element 100 comprises a first support plate 10 and a second support plate 20, wherein the first support plate 10 is the support plate described in the present disclosure. These support plates 10 and 20 may be separate components for each image element 100, but preferably, these support plates 10 and 20 are shared by the plurality of image elements 100. These support plates 10 and 20 may include glass or polymer substrates 1 and 20, and may be rigid or flexible.

The electrofluidic display device has a viewing surface 30 and a back surface 40, being capable of viewing an image display formed on the viewing surface 30 by the electrofluidic device. In FIG. 2, the first support plate 10 faces the back surface 40, the second support plate 20 faces the viewing surface 30. Alternatively, the first support plate 10 may face the viewing surface 30. The electrofluidic device may be reflective, transmissive or transflective. The electrofluidic device may be of the segmented display type, the image therein may be composed of sections, and each section includes several image elements 100. The electrofluidic device may be an active matrix driving display device, or passive driving display device. The plurality of image elements 100 may be monochromatic. For color display devices, the image elements 100 may be grouped, and each group has different colors. Alternatively, an individual image element may also display different colors.

A space between the support plate 10 and the support plate 20 is filled with two fluids: a first fluid 50 and a second fluid 60 immiscible with the first fluid 50. The second fluid 60 is conductive or electropolar and may be water or a ionic liquids such as an aqueous solution of sodium chloride. Preferably, the second fluid 60 is transparent, but may be colored, white, absorbed or reflective. The first fluid 50 is non-conductive, for example, it may be an alkane like hexadecane or (silicone) oil.

The first fluid 50 absorbs at least a part of the spectrum, and the first fluid 50 may be transmissive to a part of the spectrum, forming a color filter. For this purpose, the first fluid 50 may be dyed by adding pigment particles or dyes. Alternatively, the first fluid 50 may be black, i.e., fully absorbing or reflecting all parts of the spectrum. The reflective layer can reflect the entire visible spectrum, so that the layer becomes white, or reflect a part thereof to make it colored.

The first support plate 10 comprises the insulation layer 15. The insulation layer 15 may be transparent or reflective, and the insulation layer 15 may extend between the walls of the image element 100. As shown in FIG. 1, preferably, the thickness of the insulation layer 15 is less than 2 μm.

The insulation layer 15 comprises the first amorphous fluoropolymer layer 4 and the second amorphous fluoropolymer layer 6. Optionally, the insulation layer 15 may further comprise the dielectric layer 3 arranged below the first amorphous fluoropolymer layer 4, and the inorganic dielectric layer 3 may be a silicon oxide layer or a silicon nitride layer, having a thickness of, for example, 200 nm.

The hydrophobic feature of the surface of the insulation layer 15 allows the first fluid 50 to preferentially adhere to the insulation layer 15 because the first fluid 50 has a higher surface wettability with respect to the insulation layer 15 than the second fluid 60. The wettability relates to the relative affinity of the fluid to the solid surface.

Each image element 100 includes the electrode layer 2 that is part of the first support plate 10. The electrode layer 2 is separated from the fluid by the hydrophobic insulation layer 15; and the electrode layer adjacent to the image element 100 is separated by the non-conductive layer. Other layers may be arranged between the insulation layer 15 and the electrode layer 2. The electrode layer 2 may be any desired shape or form. It is only schematically shown in FIG. 1 that a voltage signal is supplied to the electrode layer 2 of the image element 100 via a first signal line 70. A second signal line 80 is connected to an electrode layer in contact with the conductive second fluid 60. The second electrode layer is shared by all image elements 100 when all image elements 100 are fluidly interconnected by the second fluid 60 and share the second fluid 60 without being blocked by the pixel walls 5. The image element 100 may be controlled by a voltage V applied between the signal lines 70 and 80. The electrode layer 2 on the substrate 1 is coupled to a display driving system. In the display device having the image elements 100 arranged in a matrix form, the first electrode layer 2 on the substrate 1 may be coupled to a control line matrix.

The first fluid 50 is confined within one image element 100 by the pixel walls 5 along the cross-section of the image element 100. The cross-section of the image element 100 may have any shape. When the image elements 100 are arranged in a matrix form, the cross-section is generally square or rectangular. Although the pixel walls 5 are illustrated as structures protruding from the insulation layer 15, they may also be a surface layer of the first support plate 10 repelled from the first fluid 50, such as a hydrophilic layer or a weakly hydrophobic layer. The pixel walls 5 may extend from the first support plate 10 towards the second support plate 20, but may also partially extend from the first support plate 10 towards the second support plate 20 as shown in FIG. 2. The range of the pixel 100 represented by the dotted lines A and B is defined by the center of the pixel walls 5. The area between the pixel walls 5 of the image element 100 represented by the dotted lines C and D is referred to as a display area 90 on which a display effect is produced.

Figure 3:
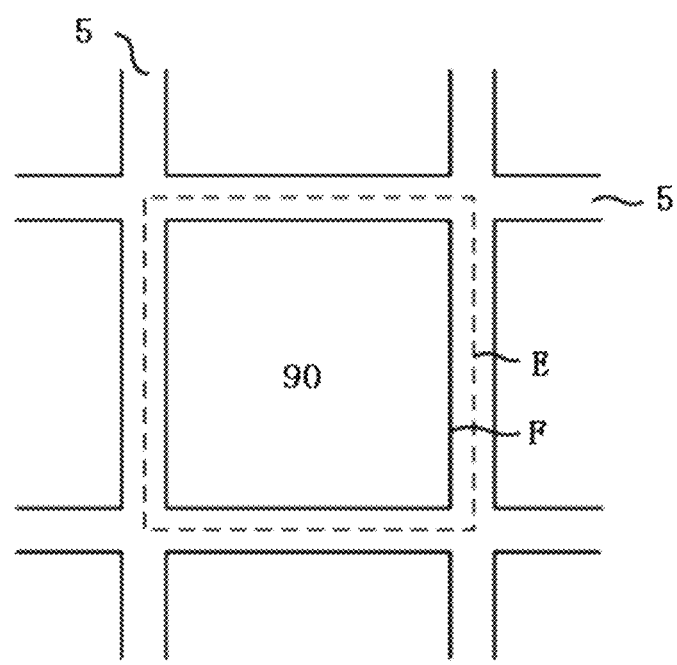
FIG. 3 is a top view of the image element structure of the electrofluidic display device of the embodiment of the present disclosure.

FIG. 3 shows a matrix of the square image elements 2 in a plan view of the insulation layer 15 of the first support plate 10. In FIG. 3, the range of the center image elements 100 (corresponding to the dotted lines A and the dotted line B in FIG. 2) is represented by a dotted line E. Line F represents the inner boundary of the pixel walls 5, and it is also the edge of the display area 90.

When no voltage is applied between the electrodes, the first fluid 50 forms a layer between the walls, as shown in FIG. 2. Applying a voltage causes the first fluid to contract, for example, against the wall, as shown by the shape of a dotted line 50-1 in FIG. 2. The controllable shape of the first fluid is used as a light valve operating image element to provide a display effect in the display area 90.

Although the present disclosure has been described with reference to the electrofluidic display device, the present disclosure is applicable to any electrowetting device in which the hydrophilic material is arranged on the hydrophobic layer. Examples of other electrofluidic devices are electrowetting optical elements such as electrowetting apertures and shutters, and lab-on-a-chip devices.

The above is the specific description of the preferred embodiments of the present disclosure, but the present disclosure is not limited to the embodiments. Those skilled in the art can also make various identical transformations or replacements without departing from the spirit of the disclosure, which shall all fall within the scope limited by the claims.

What is claimed is:

1. A method for preparing an electrofluidic support plate, comprising the following steps of:
    1) providing a substrate which has a surface provided with an electrode layer;
    2) arranging a first amorphous fluoropolymer layer on the surface of the substrate, and carrying out hydrophilic modification on a surface of the first amorphous fluoropolymer layer;
    3) arranging pixel walls on the amorphous fluoropolymer layer after the hydrophilic modification;
    4) arranging a second amorphous fluoropolymer layer which is a hydrophobic layer; the second amorphous fluoropolymer layer covering all surfaces of the pixel walls and a groove area encircled by the pixel walls;
    5) filling the groove area encircled by the pixel walls with a protective material;
    6) removing the second amorphous fluoropolymer layer not covered by the protective material and on a top of the pixel walls; and
    7) removing the protective material.

2. The method for preparing an electrofluidic support plate according to claim 1, wherein the first amorphous fluoropolymer layer and the second amorphous fluoropolymer layer obtained in the step 2) and the step 4) are formed by Dupont Teflon AF series, Solvay Hyflon series or Asahi Glass Cytop series.

3. The method for preparing an electrofluidic support plate according to claim 1, wherein a total thickness of the first amorphous fluoropolymer layer and the second amorphous fluoropolymer layer obtained in the step 2) and the step 4) is 100 nm-2000 nm.

4. The method for preparing an electrofluidic support plate according to claim 3, wherein the total thickness of the first amorphous fluoropolymer layer and the second amorphous fluoropolymer layer is 300 nm-1200 nm.

5. The method for preparing an electrofluidic support plate according to claim 1, wherein a thickness of the pixel walls obtained in the step 3) is greater than or equal to 2 µm.

6. The method for preparing an electrofluidic support plate according to claim 1, wherein the protective material in the step 5) is photoresist.

7. The method for preparing an electrofluidic support plate according to claim 1, wherein, in the step 5), the protective material is filled by any one of: dip-coating, slit-coating, screen printing, spray-coating, spin-coating or blade-coating.

8. The method for preparing an electrofluidic support plate according to claim 1, wherein a thickness of the pixel walls obtained in the step 6) is 2-20 µm.

9. An electrofluidic support plate prepared by the method according to claim 1.

10. An electrofluidic device, comprising the electrofluidic support plate according to claim 9.

* * * * *